United States Patent
Wiesendanger et al.

(10) Patent No.: US 6,465,601 B1
(45) Date of Patent: Oct. 15, 2002

(54) TRANSAMINATED DIALKYLAMINOALKYLPHENOL-3° AND 1° AMINE-CONTAINING COMPOUND

(75) Inventors: Rolf Wiesendanger, Riehen; Walter Fischer, Reinach, both of (CH); Bryan Dobinson, Surrey (GB)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/787,165

(22) PCT Filed: Sep. 4, 1999

(86) PCT No.: PCT/EP99/06520

§ 371 (c)(1),
(2), (4) Date: Jun. 15, 2001

(87) PCT Pub. No.: WO00/15687

PCT Pub. Date: Mar. 23, 2000

(30) Foreign Application Priority Data

Sep. 14, 1998 (CH) ............... 1866/98
Oct. 22, 1998 (CH) ............... 2136/98

(51) Int. Cl.$^7$ ............... C08G 14/073; C08L 63/02; C08L 75/04
(52) U.S. Cl. ............... 528/211; 525/453; 525/484; 525/523; 528/149
(58) Field of Search ............... 528/211, 149; 525/453, 484, 523

(56) References Cited

U.S. PATENT DOCUMENTS 4,269,742 A * 5/1981 Goeke et al. ............... 528/96

FOREIGN PATENT DOCUMENTS

| DE | 146754 A * | 4/1981 |
|---|---|---|
| EP | 0 684 268 A | 11/1995 |
| RU | 2071494 C1 * | 1/1997 |
| RU | 2072380 C1 * | 1/1997 |
| RU | 2114145 C1 * | 6/1998 |
| RU | 2134282 C1 * | 8/1999 |
| WO | WO 98 15588 | 4/1998 |

OTHER PUBLICATIONS

Dr. W. Hahn "Wichtige Aufbaukomponenten für Polyurethane" Polyurethane, Kunststoff Handbuch 7, pp. 12–19 and 92–101.
Lee & Neville, Handbook of Epoxy Resins, pp. 10–1 to 10–17 (McGraw–Hill Book Co., 1967).

* cited by examiner

Primary Examiner—Robert E. L. Sellers
(74) Attorney, Agent, or Firm—Proskauer Rose LLP; Kristin H. Neuman

(57) ABSTRACT

Compounds active as accelerators for curable epoxy and polyurethane systems, those compounds having been prepared by means of a transamination reaction by reacting (a) a substituted phenolic compound (Mannich base) having at least one substituent of formula $$R_1(R_2)N\text{---}CH(R_3)\text{---} \quad (A),$$

wherein $R_1$ and $R_2$ are each independently of the other linear or branched $C_{1-4}$alkyl and $R_3$ is hydrogen, methyl, ethyl or phenyl, with (b) a compound of formula $$R_4(R_5)N\text{---}C_nH_{2n}\text{---}(NH\text{---}C_nH_{2n})_q\text{---}NH_2 \quad (B),$$

wherein $R_4$ and $R_5$ are each independently of the other $C_1\text{--}C_6$alkyl or together form a radical of formula $\text{---}(CH_2)_5\text{---}$ or $\text{---}(CH_2)_2\text{---}O\text{---}(CH_2)_2\text{---}$, n is an integer from 2 to 5 and q is zero, 1, 2 or 3, and the compound obtained or the compounds present in the mixture obtained has/have on average, per molecule, at least one substituent of formula $$(R_4)(R_5)N\text{---}C_nH_{2n}\text{---}(NH\text{---}C_nH_{2n})_q\text{---}NH\text{---}CH(R_3)\text{---},$$

and the use of those compounds as accelerators in curable systems, preferably in curable epoxy and polyurethane systems.

27 Claims, No Drawings

TRANSAMINATED DIALKYLAMINOALKYLPHENOL-3° AND 1° AMINE-CONTAINING COMPOUND

The present invention relates to compounds that are active as accelerators for curable epoxy and polyurethane systems. The invention relates especially to new compounds that are obtained as reaction products of Mannich bases described hereinbelow with selected amines by means of transamination and that can be used as accelerators in curable epoxy and polyurethane systems.

Numerous curable epoxy systems are known. For certain applications, however, those systems have the disadvantage that they cure too slowly at comparatively low temperatures, that is to say at 5° C. or lower. When the atmospheric humidity is, at the same time, relatively high, this results, for example, in coatings or films of inadequate quality being obtained, for example with respect to flexibility, odour, gloss or tackiness. It has now been found that the new compounds according to the invention described hereinbelow are excellently suitable for use as accelerators in curable epoxy and polyurethane systems, the curing rate of the mentioned systems at low temperatures down to −5° C. being increased to such an extent that the described disadvantageous influence of high atmospheric humidity is substantially or completely overcome. The compounds according to the invention also have the advantage that they are of low molecular weight and comparatively low viscosity. They are therefore readily miscible with the compounds of the curable systems and positively influence the properties of the cured systems. The accelerators according to the invention are, moreover, chemically bonded in the cured systems, which means that the compounds according to the invention can be used in significantly higher concentrations. That is of fundamental importance at low temperatures (<5° C.) and currently cannot be achieved with known accelerators, which are not incorporated in the crosslinked network and render the network unusable at relatively high concentrations.

The present invention is defined in the patent claims. The present invention relates especially to compounds that are active as accelerators for curable epoxy and polyurethane systems, characterised in that the compounds are prepared by means of a transamination reaction by reacting (a) a substituted phenolic compound (Mannich base) having at least one substituent of formula

   (A), wherein $R_1$ and $R_2$ are each independently of the other linear or branched $C_1$–$C_4$alkyl and $R_3$ is hydrogen, methyl, ethyl or phenyl, with (b) a compound of formula

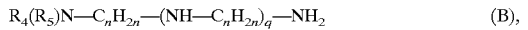   (B), wherein $R_4$ and $R_5$ are each independently of the other $C_{1-6}$alkyl or together form a radical of formula $-(CH_2)_5-$ or $-(CH_2)_2-O-(CH_2)_2-$, n is an integer from 2 to 5 and q is zero, 1, 2 or 3, and the compound obtained or the compounds present in the mixture obtained has/have on average, per molecule, at least one substituent of formula

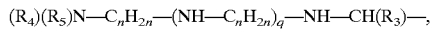, wherein the substituents $R_3$, $R_4$, $R_5$, n and q have the meanings given above.

The present invention relates also to a process for the preparation of the compounds of the invention, which are active as accelerators, which process is characterised in that, by means of a transamination reaction, (a) a substituted phenolic compound (Mannich base) having at least one substituent of formula

   (A)

is so reacted with (b) a compound of formula

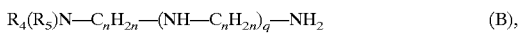   (B), wherein $R_1$, $R_2$, $R_3$, $R_4$, $R_5$, n and q have the meanings given above, that the compound obtained or the compounds present in the mixture obtained has/have on average, per molecule, at least one substituent of formula

, wherein the substituents $R_3$, $R_4$, $R_5$, n and q have the meanings given above.

The present invention relates also to the use of the compounds according to the invention as accelerators in curable systems, especially in curable epoxy and polyurethane systems.

The present invention relates also to curable systems, especially curable epoxy and polyurethane systems, comprising a compound according to the invention or a mixture of such compounds, and also to the cured products produced therefrom.

The substituted phenolic compounds (Mannich bases) are preferably low-molecular-weight-di-alkylaminomethyl-substituted phenols, ortho-, meta- and para-cresols, the isomeric xylenols, para-tert-butylphenol, para-nonylphenol, α-naphthol, β-naphthol, diphenols or polyphenols, preferably resorcinol, hydroquinone, 4,4'-dihydroxydiphenyl, 4,4'-dihydroxydiphenyl ether, 4,4'-dihydroxydiphenylsulfone, 4,4'-dihydroxydiphenylmethane, bisphenol A, and the condensation products of phenol and formaldehyde termed novolaks. Preference is given to di-$C_1$–$C_4$alkylaminomethyl-substituted phenols and cresols, especially substituted phenol.

Preferably, $R_1$ and $R_2$ are each independently of the other methyl or ethyl; $R_1$ and $R_2$ are preferably methyl. $R_3$ is preferably hydrogen, methyl or ethyl, preferably hydrogen.

The substituent (A) is preferably di-$C_1$–$C_4$alkylaminomethyl, especially dimethylaminomethyl, ethylmethylaminomethyl and diethylaminomethyl, especially dimethylaminomethyl. The decisive criterion is that it should be possible for the low-molecular-weight dialkylamine liberated in the transamination reaction to be readily removed, by virtue of its low boiling point, from the reaction mixture.

The substituted phenolic compounds are so-called Mannich bases. They are obtained in a manner known per se by reacting the phenolic compound with formaldehyde, acetaldehyde, propionaldehyde or benzaldehyde and the appropriate amine.

Mannich bases preferably used are substituted phenols of formulae (I), (IIa), (IIb) and (III), with preference being given to compounds of formulae (IIa) and (III). In practice, a mixture of those compounds may also be used. The radicals $R_1$ and $R_2$ are as defined for formula (A).

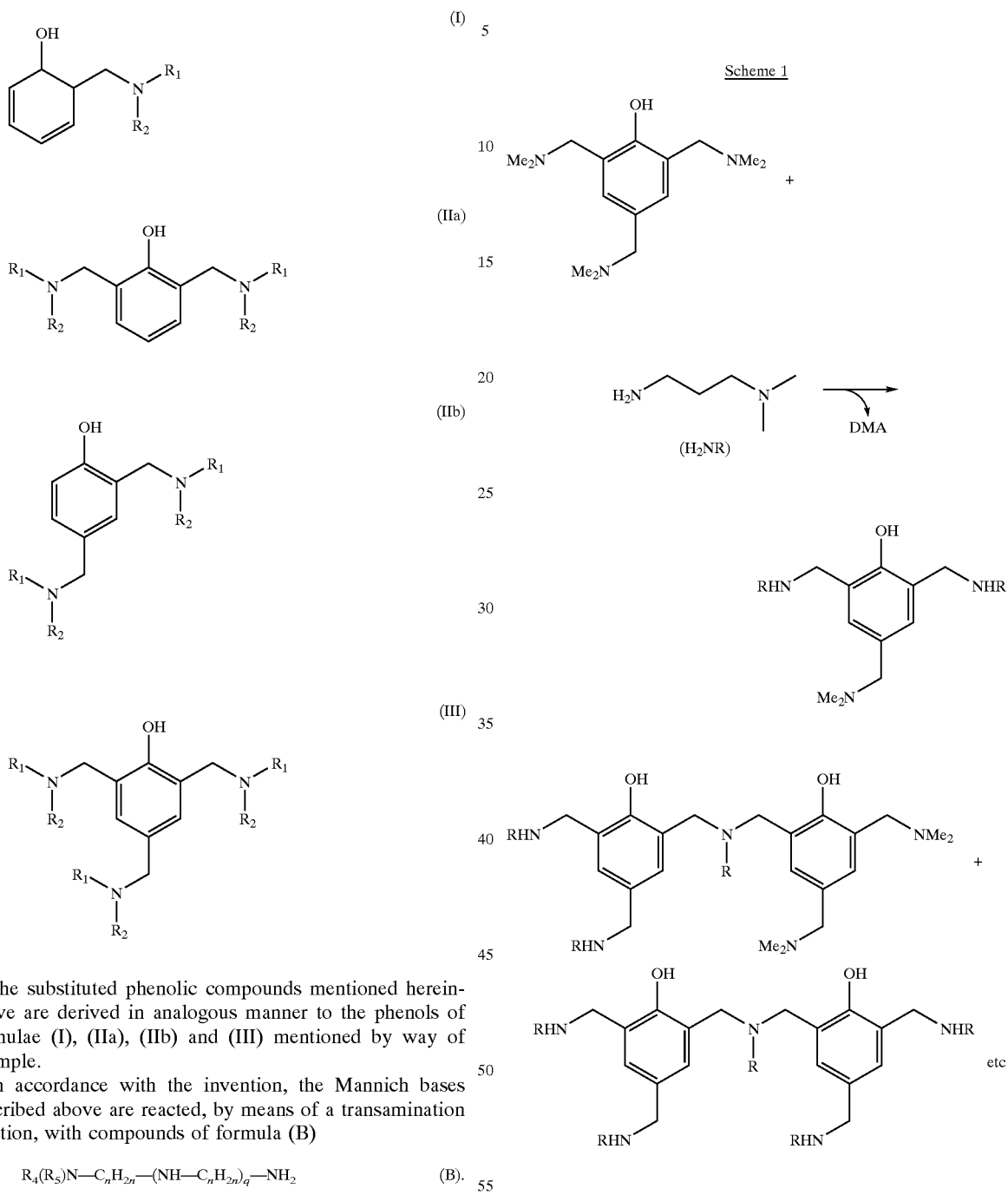

Scheme 1

The substituted phenolic compounds mentioned hereinabove are derived in analogous manner to the phenols of formulae (I), (IIa), (IIb) and (III) mentioned by way of example.

In accordance with the invention, the Mannich bases described above are reacted, by means of a transamination reaction, with compounds of formula (B)

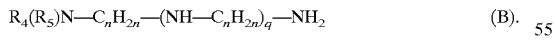

Preferably, $R_4$ and $R_5$ therein are each independently of the other $C_{1-4}$alkyl, preferably methyl or ethyl. $R_4$ and $R_5$ are preferably methyl. n is preferably 2, 3 or 4, preferably 3. q is preferably zero or 1, preferably zero.

In accordance with the preferred meanings, the corresponding reaction products are also obtained in the transamination reaction.

For example, reaction of the compound of formula (III) with dimethylaminopropylamine results in the following Reaction Scheme 1, wherein $H_2NR$ is dimethylaminopropylamine and DMA is the leaving group dimethylamine.

By means of transamination, only one dimethylaminomethyl substituent or only two of the substituents, of which there are at most three, may, as desired, be brought to reaction, the unreacted dimethylaminomethyl substituent(s) remaining unchanged on the phenolic nucleus. The above Scheme 1 also shows (bottom row) that, on continuation of the reaction, dimerisation and further reaction to linear and branched oligomeric forms occur. Scheme 2 shows the general structure of the oligomeric forms that are then formed.

Scheme 2

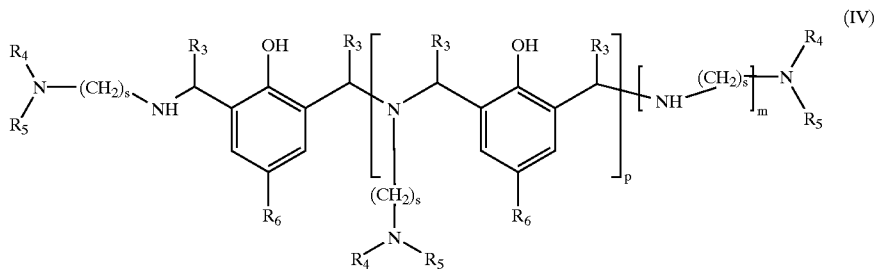

(IV)

In the above compound of formula (IV), —(CH$_2$)$_s$— corresponds to the radical —C$_n$H$_{2n}$— as defined for the compound of formula B.

As will be seen from Scheme 1 and Scheme 2, R$_6$ may be hydrogen, a radical —(CH$_2$)$_S$—N(R$_4$)R$_5$ or an oligomeric radical.

Reaction of the Mannich bases of formulae (I), (IIa) and (III) with dimethylaminopropylamine, results, for example, in the following monomeric compounds of formulae (V), (VI), (VII), (VIII), (IX) and (X), amongst others, depending on the starting material:

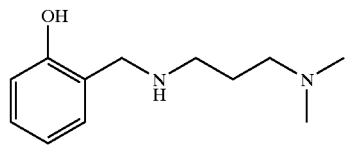
(V)

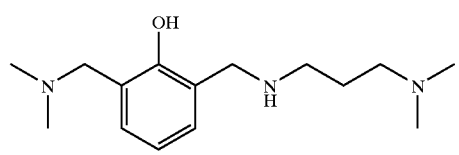
(VI)

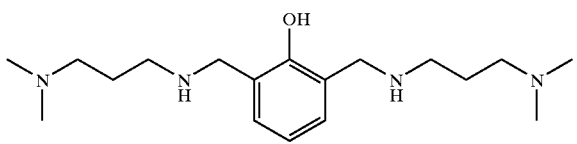
(VII)

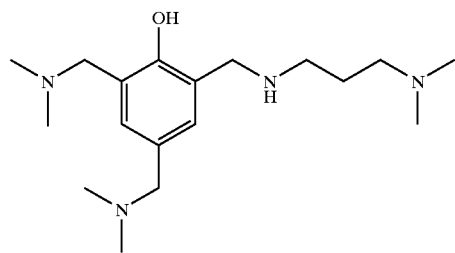
(VIII)

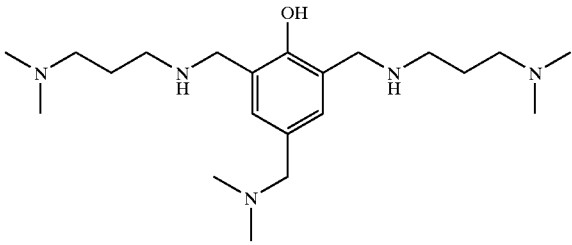
(IX)

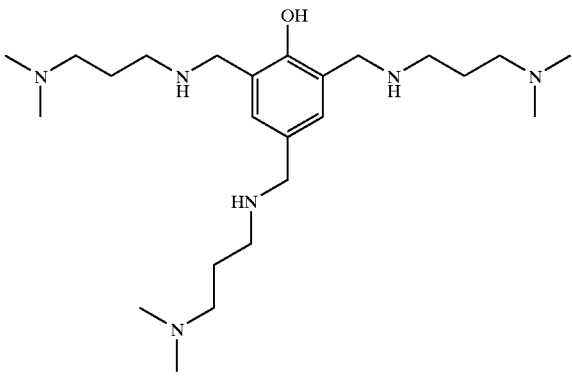
(X)

The compounds of formulae V), (VI), (VII), (VIII), (IX) and (X) are new and the present invention relates thereto. When starting from compounds of formula (IIb), the corresponding 2,4-substituted products are formed under the transamination conditions present.

The transamination reaction is preferably carried out using a compound of formula (IIa), (IIb) or (III) or a mixture of those compounds, together with a compound of formula (B), preferably dimethylaminopropylamine. Depending on the starting material used, there is obtained a corresponding mixture of the compounds of formulae (V) to (X) and corresponding oligomeric compounds, as described above. According to the invention, transamination is carried out until on average, per molecule of the Mannich base, at least one substituent has reacted with the compound of formula (B) so that as few oligomeric compounds as possible form. The transamination reaction is preferably carried out until at least 10% and a maximum of 100%, preferably at least 20% and a maximum of 80%, preferably from 50% to 80%, of the di-C$_1$–C$_4$alkylamino substituents present have reacted with the compound of formula (B). The degree of reaction is measured, for example, by measuring the amine liberated by the Mannich base. An optimum balance between monomeric and oligomeric compounds is generally achieved at a degree of reaction in the range from 60% to 75% of the di-$C_1$–$C_4$alkylamino substituents. This balance also manifests itself on measurement of the viscosity of the composition obtained, the viscosity thereof being preferably in the range from 0.1 Pa·s to 100 Pa·s (25° C.), preferably in the range from 1 Pa·s to 30 Pa·s (25° C.). The viscosity is preferably <10 Pa·s (25° C.).

When the Mannich base of formula (I) is used as starting material, the transamination reaction is carried out until practically all dialkylamino substituents or dimethylamino substituents present have reacted with the compound of formula (B).

The reactants are combined in the reactor preferably in the absence of solvents and are heated to a temperature of from 50 to 150° C., preferably from 100 to 130° C. The reaction is monitored by determination of the dialkylamine compound split off. At the desired (partial) conversion stage, the reaction is halted by lowering the temperature to about room temperature. The product mixture thereby obtained has shown itself to be storage-stable. Where appropriate, unreacted starting amine (formula B) can be removed by distillation.

In accordance with the invention, the compounds of the invention, which are active as accelerators, are used in curable systems, especially in curable epoxy and polyurethane systems. In principle, the compounds of the invention can be used in the curable systems as hardeners (instead of the hardener customarily used). It is, however, advantageous, in the systems known per se, to use a mixture of the hardener customarily used and the accelerator according to the invention, using preferably from 0.5% to 20%, preferably from 1% to 10% and especially about 5% of accelerator according to the invention (based on the total weight of the hardener customarily used and the accelerator according to the invention).

Epoxy resins that are suitable for use in the curable mixtures are the epoxy resins that are customary in epoxy resin technology. Examples of epoxy resins are:

I) Polyglycidyl and poly-(β-methylglycidyl) esters, obtainable by reacting a compound having at least two carboxyl groups in the molecule and epichlorohydrin or β-methylepichlorohydrin, respectively. Aliphatic polycarboxylic acids may be used as the compound having at least two carboxyl groups in the molecule. Examples of such polycarboxylic acids are oxalic acid, succinic acid, glutaric acid, adipic acid, pimelic acid, sebacic acid, suberic acid, azelaic acid or dimerised or trimerised linoleic acid. Cycloaliphatic polycarboxylic acids may also be used, for example tetrahydrophthalic acid, 4-methyltetrahydrophthalic acid, hexahydrophthalic acid or 4-methylhexahydrophthalic acid. Aromatic polycarboxylic acids may also be used, for example phthalic acid, isophthalic acid or terephthalic acid. Preference is given to reaction products of acids having two carboxyl groups in the molecule with epichlorohydrin and/or β-methylepichlorohydrin.

II) Polyglycidyl or poly-(β-methylglycidyl) ethers, obtainable by reacting a compound having at least two free alcoholic hydroxy groups and/or phenolic hydroxy groups under alkaline conditions, or in the presence of an acid catalyst and subsequent treatment with an alkali. The glycidyl ethers of this kind are derived, for example, from acyclic alcohols, e.g. ethylene glycol, diethylene glycol and higher poly(oxyethylene) glycols, propane-1,2-diol or poly(oxypropylene) glycols, propane-1,3-diol, butane-1, 4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol and also from polyepichlorohydrins. They are, however, also derived, for example, from cycloaliphatic alcohols, e.g. 1,4-cyclohexanedimethanol, bis(4-hydroxycyclohexyl) methane or 2,2-bis(4-hydroxycyclohexyl)propane, or they have aromatic nuclei, e.g. N,N-bis(2-hydroxyethyl) aniline or p,p'-bis(2-hydroxyethylamino) diphenylmethane. The glycidyl ethers can also be derived from mononuclear phenols, e.g. resorcinol or hydroquinone, or they are based on polynuclear phenols, such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane and on novolaks, obtainable by condensation of aldehydes, e.g. formaldehyde, acetaldehyde, chloral or furfuraldehyde, with phenols, e.g. phenol, or with phenols substituted on the nucleus by chlorine atoms or $C_1$–$C_9$alkyl groups, e.g. 4-chlorophenol, 2-methylphenol or 4-tert-butylphenol, or by condensation with bisphenols such as those of the kind mentioned above. Preference is given to reaction products of compounds having two free alcoholic hydroxy groups and/or phenolic hydroxy groups with epichlorohydrin and/or β-methylepichlorohydrin.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl) methane. The poly(N-glycidyl) compounds also include, however, triglycidyl isocyanurate, N,N'-diglycidyl derivatives of cycloalkylene ureas, e.g. ethylene urea or 1,3-propylene urea, and diglycidyl derivatives of hydantoins, e.g. 5,5-dimethylhydantoin. Preference is given to reaction products of amines containing two reactive amine hydrogen atoms with epichlorohydrin and/ or β-methylepichlorohydrin.

IV) Poly(S-glycidyl) compounds, such as di-S-glycidyl derivatives which are derived from dithiols, e.g. ethane-1,2-dithiol or bis(4-mercaptomethylphenyl) ether.

V) Cycloaliphatic epoxy resins, e.g. bis(2,3-epoxycyclopentyl) ether, 2,3-epoxycyclopentylglycidyl ether, 1,2-bis(2,3-epoxycyclopentyloxy)ethane or 3,4-epoxycyclohexylmethyl 3',4'-epoxycyclohexanecarboxylate.

It is also possible, however, to use epoxy resins wherein the 1,2-epoxide groups are bound to different hetero atoms or functional groups; such compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin and 2-glycidyloxy-1,3-bis(5,5-dimethyl-l-glycidylhydantoin-3-yl)propane, preference being given in each case to compounds containing two epoxide groups.

In the curable mixtures according to the invention, a liquid or viscous polyglycidyl ether or ester is preferably used as the epoxy resin.

Preference is given to the mentioned aromatic and/or aliphatic polyglycidyl ethers that are suitable for low-temperature curing (<5° C.).

The epoxy compounds used as starting material are known per se and, in some cases, commercially available. Mixtures of epoxy resins may also be used. All customary hardeners for epoxides may be used, for example amines, carboxylic acids, carboxylic acid anhydrides or phenols. Moreover, catalytic hardeners, for example imidazoles, may also be used. Such hardeners are described, for example, in H. Lee, K. Neville, Handbook of Epoxy Resins, McGraw Hill Book Company, 1967, pages 10–17. Preferred hardeners are polyamino compounds known per se, special preference being given to aliphatic polyamino compounds, for example isophorone-diamine or diethylenetriamine, and the higher-molecular-weight polyamines known per se.

The amount of curing agent used depends on the chemical nature of the curing agent and the desired properties of the curable mixture and of the cured product. The maximum amount can be readily determined by the person skilled in the art especially on the basis of stoichiometric calculations.

Suitable polyurethane systems for use of the compounds according to the invention are described, for example, in Kunststoff Handbuch [Plastics Handbook] No. 7, "Polyurethane" (Verlag Carl Hanser 1983) (chapter 2.2, pages 12–19). The catalysts mentioned therein (chapter 3.41., page 92ff) may be replaced partly or wholly by the accelerators according to the invention.

Preparation of the mixtures comprising epoxy or polyurethane component, hardener and accelerator according to the invention may be carried out in conventional manner by mixing together the components by manually stirring or using known mixing apparatus, for example stirrers, kneaders or rollers. Depending upon the application, customary additives, for example fillers, pigments, dyes, flow improvers or plasticisers, may be added to the mixtures. In a manner known per se, the resins according to the invention may be offered commercially in the form of two-component systems.

EXAMPLE 1

2407 g (26 equivalents) of a mixture of the Mannich bases di(2,6-dimethylaminomethyl)phenol and tris(2,4,6-dimethylaminomethyl)phenol in a ratio of 3:7 by weight, and 2652 g (26 mol) of dimethylaminopropylamine are introduced into a heatable glass flask equipped with a reflux condenser and stirrer and are heated at 120° C. with stirring. The dimethylamine (boiling point 9° C.) liberated in the course of the transamination reaction is removed continuously through the reflux condenser, condensed at −78° C. and measured. After about 4 hours, 70 mol % of the stoichiometrically available dimethylamine will have been liberated, with 1253 g (12.28 mol) of dimethylaminopropylamine having been incorporated. At that point the reaction is halted by cooling the reaction mixture. The reaction mixture obtained is then introduced into a distillation apparatus (heating jacket temperature: 90° C.). The condenser is cooled to −22° C. The evacuated apparatus has a pressure of 15–25 mbar. The distillate, dimethylaminopropylamine, is colourless, transparent and 100% pure according to HPLC and NMR measurements. The stripped residue has a viscosity of 2000 mPa·s at 25° C. and contains 0.3% dimethylaminopropylamine.

EXAMPLE 2

The accelerator prepared in Example 1 is used in accordance with Table 1. Table 1 also sets out the results obtained with an accelerator according to the prior art.

TABLE 1

|   | prior art parts by weight | according to the invention parts by weight |
|---|---|---|
| bis-A diglycidyl ether base[1] | 100 | 100 |
| IPD/TMD base[2] | 45 | 45 |
| tris(2,4,6-dimethylaminomethyl)phenol | 1.5 | |
| compound according to Example 1 | | 1.5 |
| properties after curing at 5° C.: Persoz hardness after 1, 2, 3, 7, 14 and 28 days | | |
| 1 | 30 (9)[3] | 48 (14) |
| 2 | 80 (25) | 125 (39) |
| 3 | 125 (39) | 160 (50) |
| 7 | 162 (51) | 215 (67) |
| 14 | 201 (63) | 275 (86) |
| 28 | 208 (65) | 283 (90) |

Notes:
[1]base = main component epoxy resin and optionally, additional additives
[2]base = formulated hardener, IPD = isophorone-diamine (Hüls-Chemie AG), TMD = trimethyl-hexamethylenediamine (Hüls-Chemie AG),
[3]values in () signify value as % of achievable final hardness

EXAMPLE 3

This Example demonstrates the incorporation of large amounts of accelerator in the polymeric matrix combined with a simultaneous reduction in the amine hardener. The corresponding data are to be found in Table 2.

TABLE 2

|   | without accelerator parts by weight | with accelerator parts by weight |
|---|---|---|
| bis-A diglycidyl ether base[1] | 100 | 100 |
| tetraethylenetriamine base[2] | 70 | 35 |
| compound according to Example 1 | | 20 |
| viscosity in mPa·s | 4640 | 6400 |
| gelling time in minutes | 214 | 12 |
| dust dry time in hours | 10 | 1 |
| full hardening time in hours | about 20 | about 4 |
| properties after curing at 5° C.: Persoz hardness after 1, 2, 3, 7, 14 and 28 days | | |
| 1 | soft[3] | 131 |
| 2 | 1 | 170 |
| 3 | 10 | 210 |
| 7 | 19 | 248 |
| 14 | 29 | 258 |
| 28 | 36 | 260 |

Notes:
[1]base = main component epoxy resin and, optionally, additional additives
[2]base = formulation
[3]soft = degree of hardness not measurable because of insufficient curing

EXAMPLE 4

This Example demonstrates the activity in polyurethane systems based on MDI (techincal grade of 4,4′-diisocyanatodiphenylmethane from, for example, BASF, BAYER, DOW) and polyether polyols.

|  | concentration of the compound from Example 1 | | |
| --- | --- | --- | --- |
|  | 0% | 2% | 5% |
| pot life in minutes | 60–90 | 5 | 1–2 |
| removal from mould time in hours | 16–18 | 0.5 | 1.2 |
| full hardening in hours | 24–48 | 1–2 | 1.5 |

What is claimed is:

1. A compound or mixture of compounds active as accelerators for curable epoxy and polyurethane systems, characterized in that the compound or mixture of compounds have been prepared by means of a transamination reaction by reacting
  (a) a substituted phenolic compound (Mannich base) having at least one substituent of the formula $R_1(R_2)N-CH(R_3)-$  (A), wherein
  $R_1$ and $R_2$ are each independently of the other a linear or branched $C_1$–$C_4$ alkyl, and $R_3$ is hydrogen, methyl, ethyl or phenyl, with
  (b) a compound of the formula $R_4(R_5)N-C_nH_{2n}-(NH-C_nH_{2n})_q-NH_2$  (B), wherein $R_4$ and $R_5$ are each independently of the other a $C_1$–$C_6$ alkyl, or together form a radical of formula $-(CH_2)_5-$ or $-(CH_2)_2-O-(CH_2)_2-$, n is an integer from 2 to 5, and q is zero, 1, 2, or 3, and the compound obtained or the compounds present in the mixture obtained has/have on average, per molecule, at least one substituent of formula $(R_4)(R_5)N-C_nH_{2n}-(NH-C_nH_{2n})_q-NH-CH(R_3)-$, wherein the substituents $R_3$, $R_4$, $R_5$, n and q have the meanings given above.

2. A compound or mixture of compounds according to claim 1, characterized in that the Mannich base is selected from the group consisting of low molecular weight, di-alkylaminomethyl-substituted phenols, ortho-, meta-, or para-cresols, an isomer of xylenol, para-tert-butylphenol, para-nonylphenol, α-naphthol, β-naphthol, diphenols, polyphenols, and novolaks.

3. A compound or mixture of compounds according to claim 1, characterized in that the Mannich base is a substituted phenol or cresol.

4. A compound or mixture of compounds according to claim 1, characterized in that the Mannich base is a substituted phenol.

5. A compound or mixture of compounds according to claim 1, characterized in that $R_1$ and $R_2$ are each independently of the other methyl or ethyl.

6. A compound or mixture of compounds according to claim 5, characterized in that $R_1$ and $R_2$ are methyl.

7. A compound or mixture of compounds according to claim 1, characterized in that $R_3$ is hydrogen, methyl, or ethyl.

8. A compound or mixture of compounds according to claim 7, characterized in that $R_3$ is hydrogen.

9. A compound or mixture of compounds according to claim 1, characterized in that the substituent (A) is di-$C_1$–$C_4$alkylaminomethyl.

10. A compound or mixture of compounds according to claim 9, wherein the substituent (A) is selected from the group consisting of dimethylaminomethyl, ethylmethylaminomethyl and diethylaminomethyl.

11. A compound or mixture of compounds according to claim 10, wherein the substituent (A) is dimethylaminomethyl.

12. A compound or mixture of compounds according to claim 1, characterized in that the substituted phenolic compound is selected from the group consisting of formulae (I), (IIa), (IIb), (III), and mixtures thereof

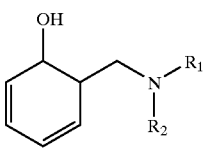
(I)

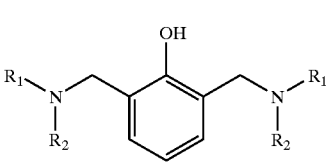
(IIa)

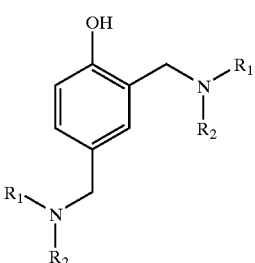
(IIb)

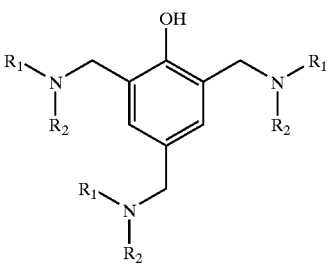
(III)

wherein the radicals $R_1$ and $R_2$ are as defined in claim 1.

13. A compound or mixture of compounds according to claim 12, wherein the substituted phenolic compound is selected from the group consisting of formulae (IIa), (III), and a mixture of those compounds.

14. A compound or mixture of compounds according to claim 1, characterized in that $R_4$ and $R_5$ are each independently of the other $C_1$–$C_4$alkyl; n is 2, 3 or 4; and q is zero or 1.

15. A compound or mixture of compounds according to claim 14, wherein $R_4$ and $R_5$ are each independently of the other ethyl or methyl.

16. A compound or mixture of compounds according to claim 15, wherein $R_4$ and $R_5$ are methyl.

17. A compound or mixture of compounds according to claim 14, wherein n is 3.

18. A compound or mixture of compounds according to claim 14, wherein q is zero.

19. A compound or mixture of compounds according to claim 1, selected from the group consisting of formulae (V), (VI), (VII), (VIII), (IX), (X), and oligomeric derivatives of those compounds

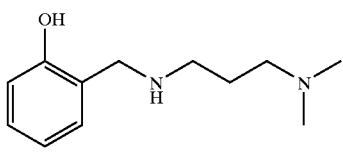
(V)

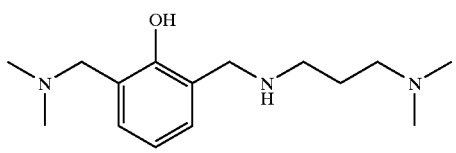
(VI)

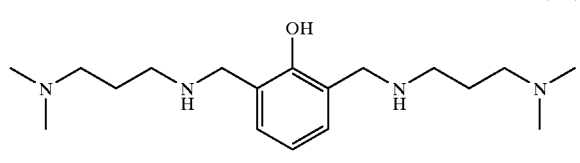
(VII)

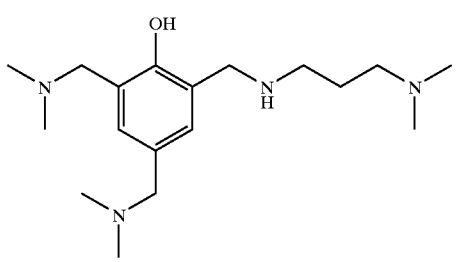
(VIII)

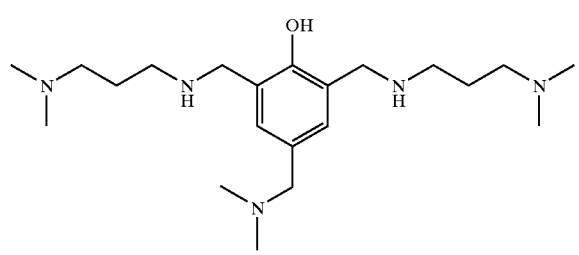
(IX)

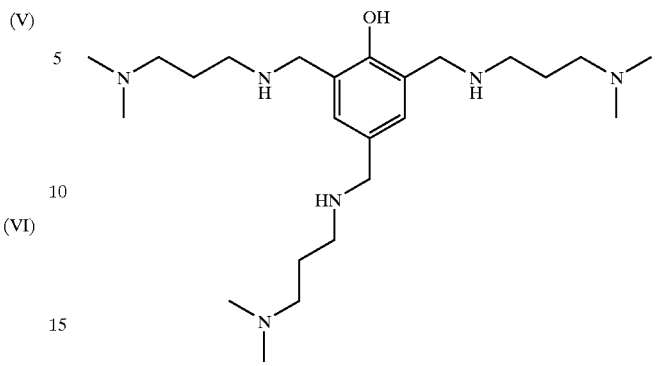
(X)

wherein the terminal nitrogen groups carry the radicals $R_4$ and $R_5$, which are as defined in claim 1.

20. A compound or mixture of compounds according to claim 1, characterized in that the transamination reaction is carried out until on average, per molecule of the Mannich base, at least one substituent reacts with the compound of formula (B).

21. A compound or mixture of compounds according to claim 20, wherein the transamination reaction is carried out until at least 10% of the di-$C_1$–$C_4$ alkylamino substituents have reacted with the compound of formula (B).

22. A compound or mixture of compounds according to claim 21, wherein the transamination reaction is carried out until at least 20% and a maximum of 80% of the di-$C_1$–$C_4$ alkylamino substituents present have reacted with the compound of formula (B).

23. A compound or mixture of compounds according to claim 21, wherein the transamination reaction is carried out until at least 50% and a maximum of 80% of the di-$C_1$–$C_4$ alkylamino substituents present have reacted with the compound of formula (B).

24. A compound or mixture of compounds according to claim 1, characterized in that transamination is carried out until the viscosity of the reaction mixture is in the range from 0.1 Pa·s to 100 Pa·s (25° C.).

25. A compound or mixture of compounds according to claim 24, wherein the viscosity of the reaction mixture is in the range from 1 Pa·s to 30 Pa·s (25° C.).

26. A compound or mixture of compounds according to claim 25, wherein the viscosity of the reaction mixture is less than 10 Pa·s (25° C.).

27. A compound or mixture of compounds according to claim 2 wherein the Mannich base is selected from the group consisting of resorcinol, hydroquinone, 4,4'-dihydroxydiphenyl; 4,4'-dihydroxydiphenyl ether; 4,4'-dihydroxydiphenylsulfone; 4,4'-dihydroxydiphenylmethane and bisphenol A.

* * * * *